United States Patent

Ashton et al.

[11] Patent Number: 5,137,071
[45] Date of Patent: Aug. 11, 1992

[54] APPARATUS FOR FORMING A COMPOSITE STRUCTURE

[75] Inventors: Larry Ashton, Mapleton; Todd H. Ashton, Provo, both of Utah

[73] Assignee: Chemicals & Materials Enterprise Assoc.

[21] Appl. No.: 382,600

[22] Filed: Jul. 21, 1989

[51] Int. Cl.$^5$ .............................................. B32B 31/00
[52] U.S. Cl. ...................... 156/382; 156/245; 156/286; 156/287; 264/314
[58] Field of Search ...................... 156/285–287, 156/245, 173, 175, 382; 264/314

[56] References Cited

U.S. PATENT DOCUMENTS

| | | | |
|---|---|---|---|
| 1,504,547 | 8/1924 | Egerton | 264/314 X |
| 2,398,876 | 4/1946 | Bailey | 18/19 |
| 2,744,043 | 5/1956 | Ramberg | 154/83 |
| 3,220,910 | 3/1962 | Walkey | 156/425 |
| 3,448,253 | 6/1969 | Bramblett et al. | 235/151.1 |
| 4,010,054 | 3/1977 | Bradt | 156/173 |
| 4,123,307 | 10/1978 | Lemelson | 156/172 |
| 4,126,659 | 11/1978 | Blad | 264/314 X |
| 4,169,749 | 10/1979 | Clark | 156/285 X |
| 4,264,278 | 4/1981 | Weingart | 416/226 |
| 4,273,601 | 6/1981 | Weingart | 156/189 |
| 4,636,275 | 1/1987 | Noroll | 156/583.3 X |
| 4,721,593 | 1/1988 | Kowal | 264/314 X |
| 4,776,996 | 10/1988 | Ashton et al. | 264/40.1 |

OTHER PUBLICATIONS

Webster's II New Riverside Dictionary, The Riverside Publishing Company, 1984, p. 587.

Primary Examiner—David A. Simmons
Assistant Examiner—Chester T. Barry

[57] ABSTRACT

An apparatus used to form a three-dimensional composite structure is disclosed having an initially rigid heat-softenable layer of ABS plastic wherein uncured portions of the composite structure are first assembled between the layer of ABS plastic and a hard mold surface. Prior to curing of the composite structure, pressure and heat are applied to the ABS layer to soften the layer and thereafter compact the uncured portions of the structure against the hard mold surface. The ability to pre-shape the ABS layer allows stiffening beams to be incorporated into the structure so as to yield a lightweight, strong composite structure that can be used as a pressure vessel in an aerospace vehicle.

18 Claims, 4 Drawing Sheets

5,137,071

APPARATUS FOR FORMING A COMPOSITE STRUCTURE

RELATED APPLICATION

This application is related to an application entitled "Method for Forming a Composite Structure", filed Jul. 21, 1989, Ser. No. 382,595, Mr. Larry J. Ashton and Mr. Todd Hunter Ashton inventors.

FIELD OF THE INVENTION

This invention relates to the formation of a composite structure by use of a heat-softenable layer of ABS plastic, wherein the composite structure is assembled adjacent the ABS layer from uncured components and thereafter cured to exacting tolerances. The composite structure includes stiffening inserts and is characterized by at least one non-planar surface formed on the interior and/or exterior of the finished composite part, due to outward projections of the various stiffening inserts from the normally curvilinear or planar surface. Filament winding techniques may be used during the assembly of the composite structure's components. The apparatus of the invention may be used to construct reinforced structural sheets, as well as reinforced cylinders for use as fuel tanks and/or pressure vessels.

BACKGROUND OF THE INVENTION

As noted in U.S. Pat. No. 2,744,043, entitles "Method of Producing Pressure Containers for Fluids", fiberglass threads or threads of other suitable material are applied in a mutually superimposed relationship on a removable core member, in a method generally known as the filament winding process, to manufacture pressure containers.

The threads are impregnated in situ, as the application of successive layers of threads proceeds, with a thermosetting plastic resinous bonding medium. The bonding medium fills the interstices in the threads, and the interstices between the layers of threads, so as to form, after curing, a substantially rigid structure having an inner surface and an outer surface.

During the initial filament winding process additional mechanical stiffeners having simple surfaces fromed parallel to the inner surface may be added, for example at the neck of the container to define a threaded attachment. Such a process yields a structure having a substantially planar interior and exterior surface, with no opportunity for other mechanical stiffening inserts. Areas of localized high stresses must be reinforced with additional layer(s) of threads, requiring overwinding of areas not necessarily requiring the additional reinforcement. The resultant composite structure therefore tends to be overweight and therefore undesirable in, for example, an aerospace application.

The core member may be removed piece by piece from the interior of the cured structure such as, for example, as disclosed in U.S. Pat. No. 3,220,910, by sawing and removing portions of a hard plaster mandrel from the interior of the cured structure. Alternatively, the core member may comprise an inflatable mandrel positioned within the windings which may be deflated for removal.

The use of an inflatable mandrel for the core member causes problems in the shape of the final part because the mandrel tends to sag or deform during the winding process. As described in U.S. Pat. No. 4,123,307, this problem may be solved by the spray-deposition of a hard plastic material on the outer surface of the inflatable mandrel while it is rotating in a fixture so as to form a self-supporting hard shell about the mandrel. Glass fibers or other filamentary material are then wound against the hard shell as it is rotated in a filament winding fixture. The shape of the hard shell attempts to accurately define the interior surface of the cured composite structure.

It can therefore be seen that it is desired to have the foundation of a hard surface upon which to build a composite structure. The interior surface of the uncured portions of a composite structure needs to be placed against a hard structure, so as to eliminate distortion or sagging in the structure, prior to the curing process.

In a similar manner it is also necessary to insure the dimensional accuracy of the exterior surface of the composite structure.

It would seem that the optimum composite formation process would merely require the positioning of the uncured portions of the composite structure against a mandrel with a hard interior surface, followed by surrounding the uncured portions with a hard exterior shell having the required exterior dimensions, and thereafter applying sufficient heat to cure the structure.

Unfortunately, during the curing process composite structures tend to "debulk", or shrink up to 20 to 25%, such that the originally uncured (as wound) wall thickness decreases substantially. With the composite structure initially positioned between two hard surfaces, during the curing process the composite structure would tend to pull away from both surfaces, and therefore yield a part having questionable surface dimensionsal accuracy as well as poor laminate compaction.

The inflatable mandrel concept attempts to solve the debulking problem by applying pressure to the interior of the part during the curing cycle, so as to maintain pressure against the interior of the composite structure and thereby force and compact the structure up against the hard exterior surface. But, as mentioned earlier, the initial assembly of the composite structure about the dimensionally unstable inflatable mandrel cannot guarantee accurate dimensional control of the composite's interior surface. The cylindrical shape of the inflatable bladder also does not allow for any integrally co-cured beam-shaped stiffening inserts to be included about the interior surface of the structure.

An apparatus therefore needs to be developed that allows the fabrication of a composite structure having accurately dimensioned interior and exterior surfaces. The apparatus will also allow the inclusion of stiffening beams, ribs, and/or blades located either longitudinally and/or radially about the interior and/or exterior surface of the composite structure, so as to yield a lightweight, structurally efficient composite structure.

SUMMARY OF THE INVENTION

The apparatus of the present invention comprises a heat softenable layer of ABS plastic which forms the interior mold for the composite structure. The apparatus also includes an exterior mold having the desired outside mold surface dimensions, and preferably an inflatable envelope bag located on the back surface of the ABS layer used to apply pressure to the layer and to the composite structure during the formation of the composite structure.

Since the ABS layer is initially hard it may incorporate cavities wherein stiffening members may be inserted during the assembly of the uncured portions of the composite structure. The exterior mold may be formed in sections about a master plug tool having the required finished surface dimensions of the desired composite structure, and thereafter disassembled and reassembled a spaced distance away from the ABS layer after the uncured portions of the composite structure have been assembled about the ABS layer.

The uncured portions of the composite structure, such as the inserts and/or filament windings required to form the structure, are therefore initially assembled on the hard surface of the ABS layer. Prior to the start of the cure of the composite structure pressure is applied to the back surface of the layer and heat is applied to the ABS layer to soften the layer, the pressure forcing the heat-softened layer and the assembled uncured portions of the composite structure outwardly into contact with the exterior mold surface.

Shrinkage of the composite structure due to the debulking process during the cure cycle is therefore entirely compensated for by the softening of the ABS layer and its outward movement towards the exterior mold surface.

The ABS layer therefore provides a hard surface when needed during the assembly of the uncured portions of the composite structure, so as to allow the portions of the structure to be precisely positioned prior to cure. The ABS layer forms an outwardly moveable soft surface, when required to compensate for the shrinkage of the composite structure during the curing of the composite structure.

Prior to starting the cure of the composite structure, in anticipation of the debulking of the structure, pressure is applied to the back of the ABS layer and the ABS layer is thereafter softened by the application of heat, the pressure forcing the softened ABS layer and the interior of the composite structure towards the exterior mold. This pressure is maintained during the curing process of the composite structure, such that any debulking shrinkage is compensated for by the pressure applied to the interior of the structure.

The resulting composite structure is accurately dimensioned and includes any necessary longitudinal and/or circumferential stiffener systems, yielding a part exhibiting close tolerances, light weight, and exceptional strength.

It is therefore an object of the invention to form an accurately dimensioned three dimensional composite structure that may incorporate stiffening members wherever required.

It is an object of the invention to produce a dimensionally accurate, lightweight, strong composite structure.

It is a feature of the present invention to use a heat softenable layer of ABS plastic that presents a hard surface during the composite structure assembly, yet softens and is forced outwardly during the curing of the composite structure.

It is a feature of the present invention to provide and inflatable mandrel positioned on the back surface of the ABS layer, capable of driving the softened ABS layer outward so as to drive the composite structure into compacted engagement with the exterior mold surface.

These and other features, objects, and advantages of the present invention will become apparent from the following Detailed Description, wherein reference is made to the Figures in the accompanying drawings.

DETAILED DESCRIPTION OF THE INVENTION

Figure 1:
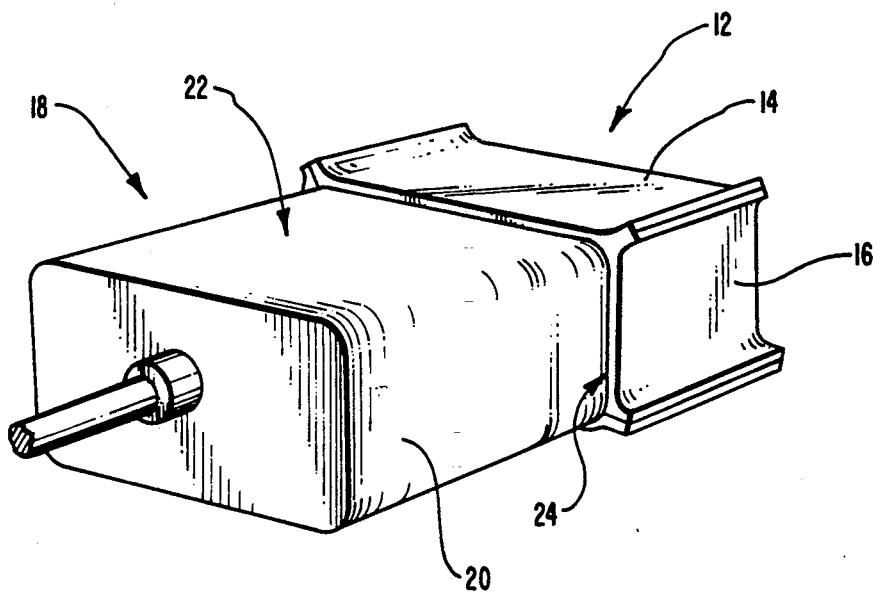
FIG. 1 shows a schematic representation in an isometric view of clamshell sections formed about a portion of the master plug tool.

Referring now to FIG. 1 in a preferred embodiment of the present invention, a first exterior mold means 12 comprising a clamshell 14 having individual sections 16 is formed about a master plug tool 18 having a finished surface 20 which represents the preferred outside dimension 22 of the finished part. Clamshell reference surface 24 accurately represents the finished surface 20 such that the dimensions of the exterior surface 26 (FIG. 7) of the cured composite structure 28 will accurately reflect the dimensions of the finished surface 20.

The clamshell 14 is preferably formed by graphite or fiberglass fibers laid up over the master plug tool, and thereafter saturated with a hardenable resin such as prepreg epoxy or wet layup of GR/E of Glass/E cloth. It is well understood that other exterior mold means 12 may be fabricated and/or assembled by other methods well known to the art.

Figure 2:
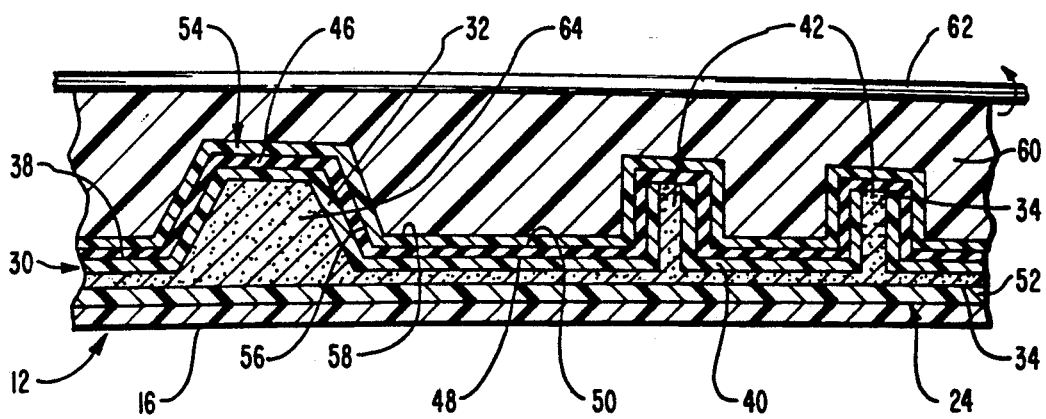
FIG. 2 shows a schematic cross-section in side view of the ABS layer positioned a spaced distance from the clamshell surface, the ABS layer backed by an envelope bag, fiberglass backing layer, and hardened foam.

Referring now to FIG. 2, the clamshell section 16 is shown after removal from the master plug tool with the reference surface 24 facing upward to form a support for the layers of material that will be placed upon it, such as heat-softenable second interior mold means 30, in a preferred embodiment comprising a layer 32 of heat deformable ABS plastic, which has an initially rigid mold surface 34 patterned in the shape of the desired interior surface 36 (FIG. 7) of the cured composite structure 28. The ABS layer 32 also includes a back surface 38. The ABS layer 32 may include a pan structure 40 formed between adjacent edges of a blade stiffener setback former 42.

The ABS layer is formed, of course, from acrylonitrile butadiene styrene terpolymer.

The mold surface 34 of the ABS layer is located a spaced distance away from and faces reference surface 24 of the clamshell, the composite structure being formable between the mold surface 34 and the reference surface 24 as explained more fully below.

The ABS layer has previously been vacuum-formed about a wood, fiberglass, or metal mold having the desired shape, and in a preferred embodiment has a thickness of 0.020–0.030 inches.

The apparatus for use in forming the composite structure 28, in addition to the previously mentioned clamshell and the ABS layer, can be seen to include compaction means 44 such as envelope bag 46 having an outer surface 48 and an inner surface 50 formed from an elastomeric material such as silicone rubber, and also means for applying heat to the heat softenable interior mold means 30 so as to soften the interior mold means, such as an autoclave with heater elements incorporated therein (not shown), well known to the art.

The envelope bag 46 has previously been vacuum-formed over an appropriately shaped modeling mold (not shown) from green silicone rubber and cured at 250–350 degrees Fahrenheit in a shape to cooperatively engage the back surface of the ABS layer 32. The bag 46 in a preferred embodiment has a thickness of 0.090 inches.

During the assembly of the ABS layer, envelope bag 46, and the setback material 52 (such as wax, fiberglass, or plaster), means for structural support are in a preferred embodiment placed behind the envelope bag and the ABS layer. Such means include a fiberglass backing 54 having an and an outer surface 56 and an inner surface 58 positioned on the inner surface 50 of the envelope bag 46. The fiberglass backing is preferably made from one or two layers of E-glass fibers and would have a thickness of 0.020 inches, the fiberglass backing being formed on top of the cured envelope bag.

Structural support is also added by foam 60 flooded in back of the fiberglass backing 54. Prior to hardening, shaft 62 may be rotated to centrifugally force the foam adjacent the fiberglass backing 54, (if it is used), or in any event the foam may be forced and thereafter hardened against the envelope bag 46. The foam in a preferred embodiment comprises A/B polyurethane resin, having a set time of 30 minutes and a density of 4–6 lbs per cubic foot.

It should be well understood that the means of structurally supporting the ABS layer and the envelope bag may be varied depending on the shape and size of the composite structure to be manufactured.

I-beam stiffener setback former 64 formed from setback material 52 is also shown defined upwardly adjacent the ABS layer 32, the setback material first being laid on the clamshell surface 24 before the ABS layer is placed on top of the material. The setback material has previously been shaped by placing plies of tooling wax or fiberglass into the clamshell tool. The setback duplicates the thickness and contour expected of the final skin laminate.

Figure 3:
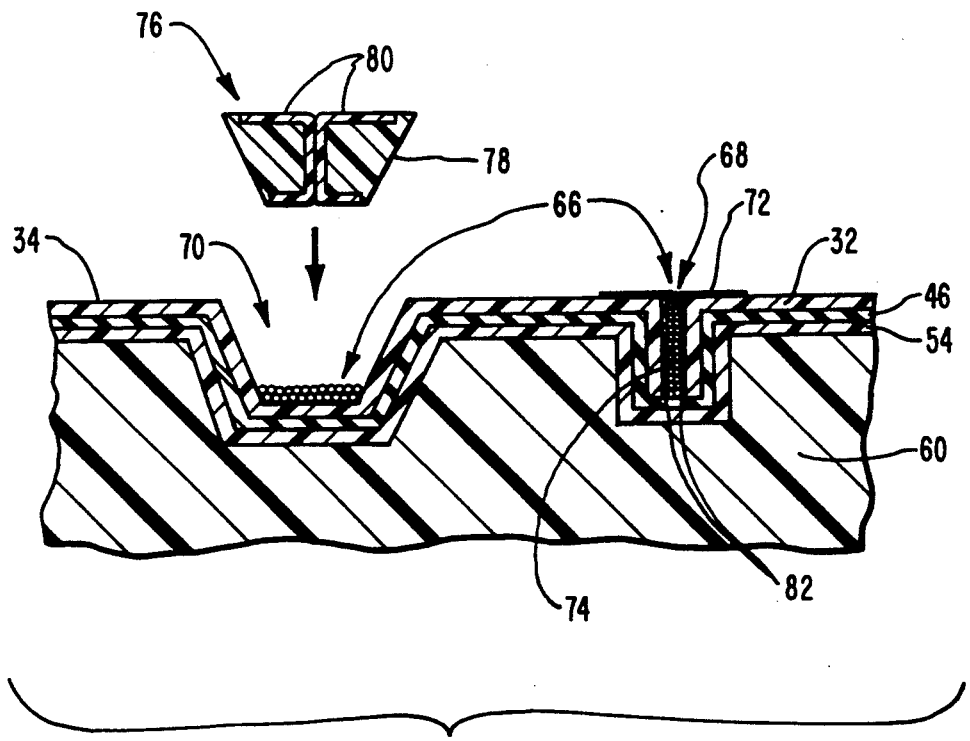
FIG. 3 shows a schematic cross-section in side view of inserts placeable in cavities defined downwardly in the ABS layer.

Referring now to FIG. 3, the clamshell and the setback material have been removed from the mold surface 34, and uncured portions of the composite structure are thereafter assembled adjacent the mold surface 34. Winding 66, such as carbon, graphite or glass fibers saturated with epoxy resin can be wound by filament winding machines (not shown) in winding cavity 68, or in insert cavity 70. Shear ply 72 may be positioned adjacent the wall 74 of the winding cavity prior to the step of winding the resin-wetted fiber into the winding cavity 68. The shear plys in a preferred embodiment comprise graphite/epoxy fabric material having a thickness of approximately 0.013 inches and plied to the needed thickness, purchased from Hercules Corporation or other prepreg sources. The fabric may also be made from filament wound broadgoods.

I-beam inserts 76 may be preassembled, having rubber intensifier(s) 78 inserted in the I-beam section 80, prior to inserting the I-beam inserts 76 into cooperatively shaped insert cavities 70 defined downwardly in the mold surface 34. The I-beam sections in a preferred embodiment are fabricated with graphite or fiberglass fibers and have a thickness of from 0.040 to about 0.150 inches.

The combination of shear plys and windings 66 placed downwardly within winding cavity 68 forms blade stiffener assembly 82. The foam 60 and fiberglass backing layer 54 in a preferred embodiment remain operatively engaged to the envelope bag 46 and hard ABS layer 32 so as to insure the dimensional stability of the hard ABS layer 32 as the uncured portions of the composite structure are assembled adjacent the mold surface 34.

It should be well understood that many other reinforcement devices may be used to stiffen the composite structure, such as "C", "J", "Z" sections and/or channels, or any other shaped material(s) as required to stiffen the cured composite structure.

Figure 4:
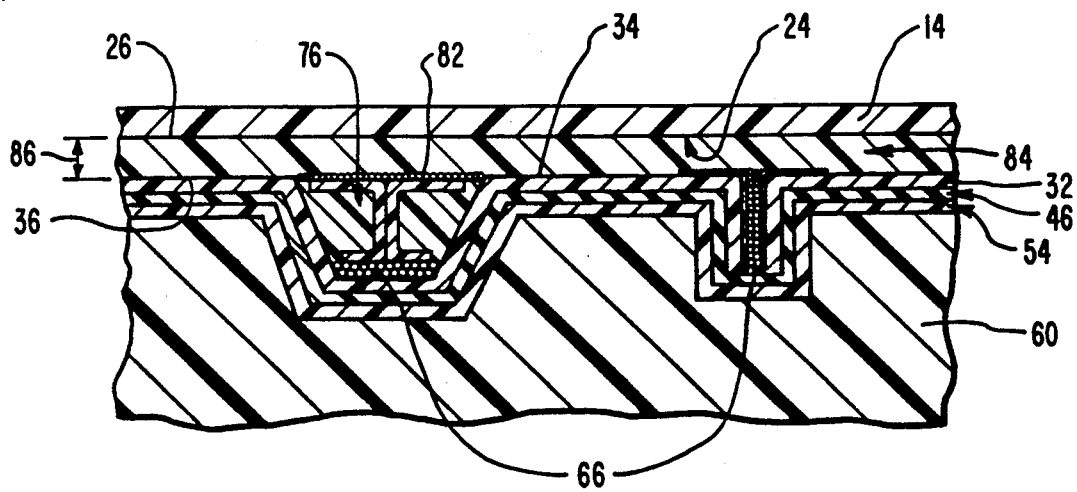
FIG. 4 shows a schematic cross-section in side view of the composite structure assembled between the ABS layer and the clamshell.

Referring now to FIG. 4, additional uncured portions of the composite structure have been assembled adjacent the mold surface. Additional windings 82 may be wound about the I-beam inserts 76 so as to hold the inserts securely relative to the ABS layer 32. Other resin wetted fiber and/or tape 84 is thereafter wound about the mold surface to a particular spaced distance 86. A discussion of methods of winding filaments and/or tape about a surface may be found in U.S. Pat. Nos. 3,448,253; 4,010,054; 2,398,876; 4,273,601 and/or 4,264,278.

It is important to note at this point that the uncured composite structure is dimensionally-stabilized between two hardened surfaces 24,34 as is desired at this point in the process. The structure has been effectively assembled on a hard mandrel of the ABS layer.

Figure 5:
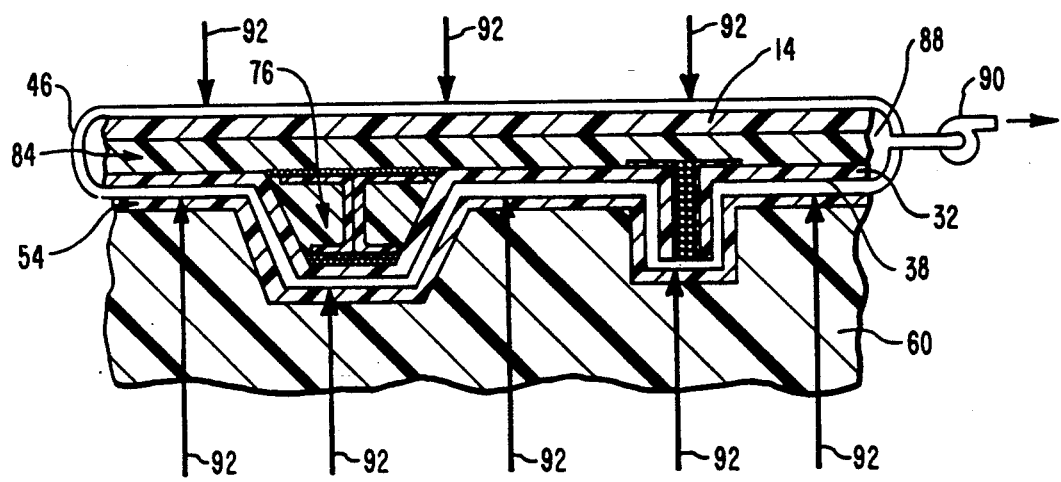
FIG. 5 shows a schematic cross-section in a side view of the envelope bag forming a pressure boundary around the ABS layer, composite structure, and clamshell.

Referring now to FIG. 5, at this point in the process pressure is applied and maintained on the back surface of the ABS layer 32 by wrapping the envelope bag 46 about the edges of the ABS layer and the clamshell 14, so as to form a first pressure boundary cavity 88 about the ABS layer, uncured composite structure, and clamshell 14. A vacuum of 20 to about 27 inches mercury is then created in the first pressure boundary cavity 88 by actuation of a vacuum pump 90 placed in fluid communication with cavity 88, as is well known to the art. Additional pressure in a preferred embodiment is also applied by enclosing the uncured composite structure, clamshell, and ABS layer, along with the envelop bag 46 into an autoclave (not shown) and pressurizing the interior of the autoclave to a pressure of 50 to about 100 psig, the autoclave pressure indicated by arrows 92.

Figure 6:
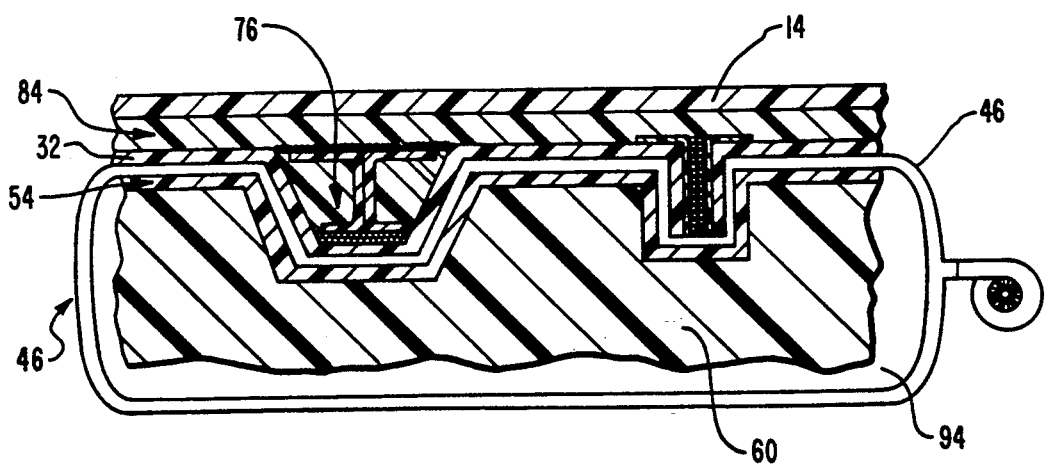
FIG. 6 shows a schematic representation in cross-section in a side view of the envelope bag enclosing the fiberglass backing layer and thereafter forming a pressure boundary cavity.

Referring now to FIG. 6, in an alternative embodiment dependent on the pressures to be applied to the uncured composite structure, a second pressure boundary cavity 94 may be formed by wrapping the envelope bag 46 below the ABS layer 32 and thereafter pressurizing the cavity 94 to a pressure of approximately 50 psi. In both examples of applying and maintaining pressure, the ABS layer 32 will be driven upwardly towards the clamshell reference surface so as to start compaction of the uncured composite structures.

The ABS layer is thereafter heated, in a preferred embodiment by thermal energy added by the autoclave enclosure and transferred to the layer by convection and/or conduction, such as by hot nitrogen gas or any other methods well known to the art. The nitrogen gas is typically heated from hot oil in tubes or through electrical heating elements.

It should be well understood that the ABS layer, (along with the composite structure during the curing process), may be heated by many other method well known to the art, such as by RF energy.

The ABS layer is softened in a preferred embodiment by heating the layer to approximately 235° F., the deformation temperature of ABS plastic. It is well understood that many other heat-softenable plastics may be used to accomplish the same mechanical result. The softened ABS layer and the composite structure are thereafter further compacted against the clamshell reference surface by the pressurized envelope bag.

Figure 8:
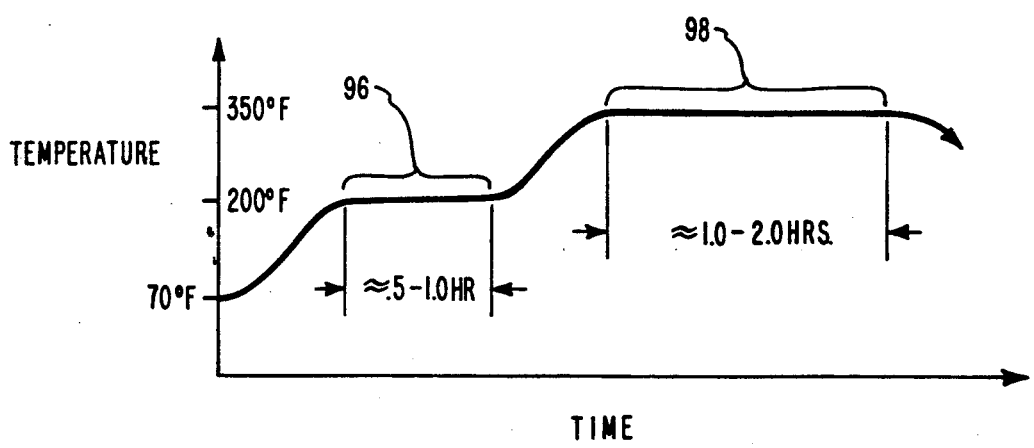
FIG. 8 shows a graphical representation of an autoclave cure cycle.

Referring to FIG. 8, in a preferred embodiment the ABS is allowed to soften from between ½ hour to 1 hour at a first temperature of deformation 96. The uncured composite structure is thereafter heated to a second temperature of cure 98 for a sufficient period such as 1 to 2 hours to allow the entire composite structure to cure. The debulking or shrinkage of the composite structure during the curing process is compensated by outward movement of the envelope bag and softened ABS layer towards the clamshell surface so as to compact the now-curing composite structure. The composite structure is maintained at the second temperature of cure or higher to effect a post cure or until the structure cures sufficiently to dimensionally stabilize.

The pressure is thereafter relieved from the back surface of the ABS layer and the cured composite structure is removed from between the clamshell reference surface and the mold surface of the ABS layer. In a preferred embodiment, the ABS layer and foam is discarded after each cured composite structure is produced but the envelope bag 46 and fiberglass backing layer is reusable. In an alternative embodiment the ABS layer may remain attached to the cured composite structure.

It should be well understood that the heat for softening the ABS layer may be sufficient to cure the composite structure, or in the alternative, the resin incorporated within the composite structure may not require external sources of heat to complete its curing process. For certain resin systems it would be sufficient merely to heat the ABS layer to its deformation temperature, without proceeding to a second temperature of cure.

Figure 7:
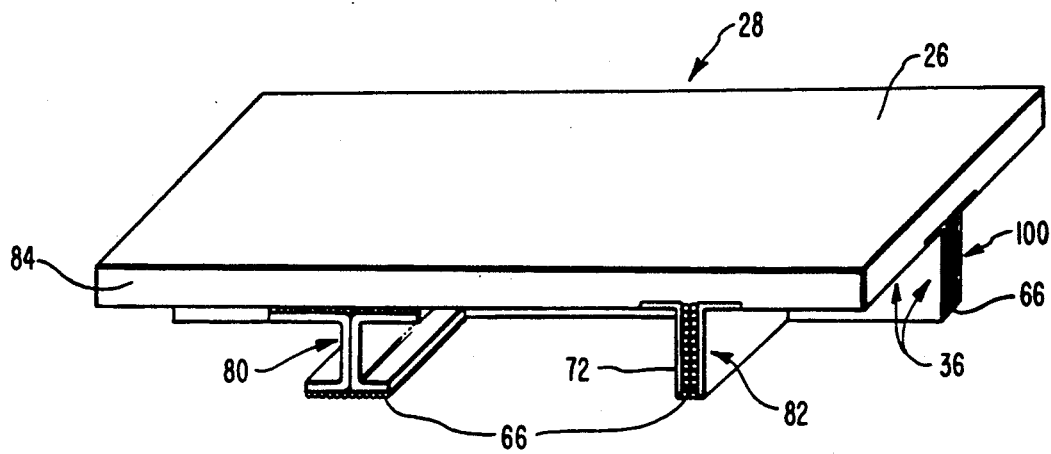
FIG. 7 shows a schematic representation in an isometric view of a three-dimensional cured composite structure.

Referring now to FIG. 7 a three-dimensional cured composite structure 28 is shown.

One advantage of the invention is the ability, by the use of filament winding machines having perpendicular axis of application, to form cross stiffener assembly 100 essentially perpendicular to the blade stiffener 82, by alternating the application of filaments during the building up of windings 66 in each assembly 82, 100. A pressure vessel wall, or any other laminate structure, may therefore be essentially braced in any three dimensional manner by the teachings of the present invention.

It should be well understood that in the case of formation of a cylindrical vessel the interior mold means will typically be driven outward by the compaction means 44 towards the hard exterior mold means. In the case of the formation of a flat composite structure, the compaction means may be located on either, (or both), sides of the mold means to drive the mold means towards each other. The compaction means need not be limited to the envelope bag, but may, in an alternative embodiment, comprise for example a hydraulic press assembly well known to the art.

It should also be well understood that the heat-softenable layer may also be used to form the exterior mold means, and that the exterior mold means may be driven by the compaction means toward a hard interior mold means, depending on the design of the composite structure.

Additionally the heat-softenable layer may be used to form both the interior mold means and the exterior mold means, depending again on the required design of the composite structure, wherein both heat-softenable layers may be driven toward each other. Such a system would be used, for example, if it was desired to incorporate stiffening members on both the interior surface and the exterior surface of the composite structure.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings refer to in the foregoing description are illustrative only and are not intended as limitations on the scope of the invention.

We claim as our invention:

1. Apparatus for use in forming a composite structure having an interior surface and an exterior surface, said apparatus comprising:
    hollow exterior mold means having a reference surface shaped to pattern the desired shape of the exterior surface of said composite structure,
    heat-softenable interior mold means disposed inside said exterior mold means having an initially rigid mold surface shaped to pattern the desired interior surface of said composite structure and a back surface, said mold surface located a spaced distance away from and facing said exterior mold means reference surface, said composite structure formable between said mold surface and said reference surface,
    compaction means for applying and maintaining pressure on the back surface of said heat-softenable interior mold means, and
    means for applying heat to said heat-softenable interior mold means to soften said interior mold means.

2. The apparatus of claim 1 wherein said exterior mold means further comprises a sectionable clamshell previously formed about a master plug tool.

3. The apparatus of claim 1 wherein said heat-softenable interior mold means further comprises a layer of heat deformable plastic.

4. The apparatus of claim 3 wherein said heat deformable plastic layer further includes insert cavities defined downwardly therein shaped to receive I-beam inserts of said composite structure.

5. The apparatus of claim 3 wherein said plastic layer further includes winding cavities defined downwardly therein shaped to receive windings.

6. The apparatus of claim 5 wherein said winding cavities further include winding walls shaped to receive shear plys therein.

7. The apparatus of claim 1 wherein a portion of said compaction means further comprises an envelope bag formed from an elastomeric material, said envelope bag sealable about its edges with other portions of said compaction means to define at least one pressure boundary cavity capable of applying pressure to the back of said interior mold means.

8. The apparatus of claim 1 wherein said means for applying heat to said heat-softenable interior mold means comprises the heated interior of an autoclave.

9. The apparatus of claim 1 further including:
means for forming an uncured composite structure between said exterior mold means and said interior mold means.

10. The apparatus of claim 9 wherein said means for forming an uncured composite structure between said exterior mold means and said interior mold means comprises a filament winding machine.

11. The apparatus of claim 9 wherein said means for forming an uncured composite structure between said exterior mold means and said interior mold means comprises a tape-laying machine.

12. The apparatus of claim 1 further including:
means for applying heat to an uncured composite structure assembled between said interior mold means and said exterior mold means to cure said composite structure.

13. The apparatus of claim 12 wherein said means for applying heat to said uncured composite structure comprises the heated interior of an autoclave.

14. Apparatus adapted to form a composite structure having an interior surface and an exterior surface, said apparatus comprising:
hollow exterior mold means having a rigid reference surface pattern of the desired exterior surface of said composite structure,
heat-softenable interior mold means disposed inside said exterior mold means having an initially rigid mold surface pattern of the desired interior surface of said composite structure and a back surface, said mold surface locatable a spaced distance away from and capable of facing said reference surface, said composite structure formable between said mold surface and said reference surface,
compaction means capable of applying and maintaining pressure on the back surface of said heat-softenable interior mold means, and
means for applying heat to said heat-softenable interior mold means to soften said interior mold means.

15. An apparatus for use in forming a composite structure, said apparatus comprising:
(a) a first hollow mold means,
(b) a second mold means disposed inside said first mold means opposing said first mold means, said composite structure being formable between said first mold means and said second mold means, said second mold means being a thin, rigid structure at normal working temperatures capable of receiving thereagainst without distortion thereto constituents of the composite structure, and said second mold means being heat-softenable into a deformable state at temperatures used to cause the composite structure,
(c) compaction means located adjacent at least said second mold means on the side thereof opposite from said first mold means for urging said second mold means toward said first mold means and compacting said composite structure between said first mold means and said second mold means when said second mold means is in said deformable state thereof, and
(d) means for applying heat to said second means to cure said second mold means to assume said deformable state thereof.

16. An apparatus as recited in claim 15, wherein said second mold means comprises a shell of heat-deformable plastic.

17. An apparatus as recited in claim 15, wherein said compaction means comprises a fluid tight envelope disposed against said side of said second mold means opposite from said first mold means, said envelope being capable of receiving fluid under positive pressure to urge said second mold means toward said first mold means.

18. An apparatus as recited in claim 15, wherein said compaction means comprises a fluid tight envelope disposed about said first and second mold means, said envelope being capable of receiving a negative fluid pressure, whereby to draw said second mold means toward said first mold means.

* * * * *